United States Patent
Wang et al.

(10) Patent No.: US 11,706,631 B2
(45) Date of Patent: Jul. 18, 2023

(54) USER EQUIPMENT AND METHOD FOR FBE OPERATION IN UNLICENSED BAND

(71) Applicant: FG Innovation Company Limited, Tuen Mun (HK)

(72) Inventors: Hai-Han Wang, Taipei (TW); Heng-Li Chin, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 61 days.

(21) Appl. No.: 17/321,810

(22) Filed: May 17, 2021

(65) Prior Publication Data
US 2021/0360421 A1 Nov. 18, 2021

Related U.S. Application Data

(60) Provisional application No. 63/025,888, filed on May 15, 2020.

(51) Int. Cl.
*H04W 16/14* (2009.01)
*H04W 74/08* (2009.01)
*H04W 8/24* (2009.01)
*H04W 72/23* (2023.01)

(52) U.S. Cl.
CPC ............ *H04W 16/14* (2013.01); *H04W 8/24* (2013.01); *H04W 72/23* (2023.01); *H04W 74/0808* (2013.01)

(58) Field of Classification Search
CPC ... H04W 16/14; H04W 8/24; H04W 72/1289; H04W 74/0808; H04W 72/23
See application file for complete search history.

(56) References Cited

U.S. PATENT DOCUMENTS

| | | | |
|---|---|---|---|
| 2016/0192396 A1 | 6/2016 | Ng | |
| 2017/0238342 A1* | 8/2017 | Yang | H04W 74/04 370/329 |
| 2019/0335456 A1* | 10/2019 | Yerramalli | H04W 74/0808 |
| 2020/0037354 A1* | 1/2020 | Li | H04W 74/0808 |
| 2020/0280971 A1* | 9/2020 | Moon | H04L 5/0094 |
| 2020/0305191 A1* | 9/2020 | Moon | H04W 72/1289 |

(Continued)

FOREIGN PATENT DOCUMENTS

| | | |
|---|---|---|
| CN | 105577339 A | 5/2016 |
| TW | 201625044 A | 7/2016 |
| WO | 2020/091561 A1 | 5/2020 |

OTHER PUBLICATIONS

Qualcomm Incorporated, "Summary of NR-U agreements till RAN1 #99", R1-1913599, 3GPP TSG RAN WG1 Meeting #99, Reno, USA, Nov 18-Nov. 22, 2019.

(Continued)

*Primary Examiner* — Michael K Phillips
(74) *Attorney, Agent, or Firm* — ScienBiziP, P.C.

(57) ABSTRACT

A user equipment (UE) and a method for frame-based equipment (FBE) operation in an unlicensed band are provided. The method includes receiving, from a base station (BS), a first parameter indicating a first periodicity of a fixed frame period (FFP) used when the BS acts as an initiating device for the FBE operation; and receiving, from the BS, a second parameter indicating a second periodicity of the FFP used when the UE acts as the initiating device for the FBE operation.

20 Claims, 6 Drawing Sheets

(56) References Cited

U.S. PATENT DOCUMENTS

| | | | |
|---|---|---|---|
| 2021/0084683 A1* | 3/2021 | Li | H04W 74/0833 |
| 2021/0100030 A1* | 4/2021 | Myung | H04W 74/0833 |
| 2021/0195643 A1* | 6/2021 | Talarico | H04W 76/27 |
| 2021/0259014 A1* | 8/2021 | Falahati | H04W 72/1268 |
| 2021/0298072 A1* | 9/2021 | Oh | H04W 72/0446 |
| 2021/0385863 A1* | 12/2021 | Fan | H04W 74/0816 |
| 2022/0248466 A1* | 8/2022 | Fan | H04W 74/004 |
| 2022/0279592 A1* | 9/2022 | Wu | H04W 74/004 |
| 2022/0295575 A1* | 9/2022 | Sun | H04W 74/0841 |
| 2022/0322118 A1* | 10/2022 | Kim | H04L 27/26025 |
| 2022/0330340 A1* | 10/2022 | Lei | H04W 74/0808 |
| 2022/0408461 A1* | 12/2022 | Lei | H04W 72/23 |
| 2023/0032015 A1* | 2/2023 | Xu | H04W 74/0808 |
| 2023/0035989 A1* | 2/2023 | Awadin | H04W 74/0808 |

OTHER PUBLICATIONS

Ericsson, "DL signals and channels for NR-U", R1-1912707, 3GPP TSG-RAN WG1 Meeting #98bis, Reno, USA, Nov. 18-22, 2019.

ETSI EN 301 893, "5 GHz RLAN; Harmonised Standard covering the essential requirements of article 3.2 of Directive 2014/53/EU", V2.1.1 (May 2017).

3GPP TS 38.211, "3rd Generation Partnership Project; Technical Specification Group Radio Access Network; NR; Physical channels and modulation (Release 15)", V15.8.0 (Dec. 2019).

3GPP TS 38.213, "3rd Generation Partnership Project; Technical Specification Group Radio Access Network; NR; Physical layer procedures for control (Release 15)", V15.8.0 (Dec. 2019).

3GPP TS 38.214, "3rd Generation Partnership Project; Technical Specification Group Radio Access Network; NR; Physical layer procedures for data (Release 16)", V16.1.0 (Mar. 2020).

3GPP TS 38.133, "3rd Generation Partnership Project; Technical Specification Group Radio Access Network; NR; Requirements for support of radio resource management (Release 16)", V16.3.0 (Mar. 2020).

3GPP TR 22.804, "3rd Generation Partnership Project; Technical Specification Group Services and System Aspects; Study on Communication for Automation in Vertical Domains (Release 16)", V16.2.0 (Dec. 2018).

* cited by examiner

300

400

USER EQUIPMENT AND METHOD FOR FBE OPERATION IN UNLICENSED BAND

CROSS-REFERENCE TO RELATED APPLICATION(S)

The present disclosure claims the benefit of and priority of provisional U.S. Patent Application Ser. No. 63/025,888, filed on May 15, 2020, entitled "FBE operation for IIoT in unlicensed band" ("the '888 provisional"). The disclosure of the '888 provisional is hereby incorporated fully by reference into the present disclosure for all purposes.

FIELD

The present disclosure is related to wireless communication, and specifically, to a frame-based equipment (FBE) operation in an unlicensed band in cellular wireless communication networks.

BACKGROUND

Abbreviations used in this disclosure include:
Abbreviation Full name
3GPP 3$^{rd}$ Generation Partnership Project
5G 5$^{th}$ Generation
ACK Acknowledgment
AS Access Stratum
BS Base Station
BW Bandwidth
BWP Bandwidth Part
C-RNTI Cell Radio Network Temporary Identifier
CA Carrier Aggregation
CCA Clear Channel Assessment
CG Configured Grant
CO Channel Occupancy
COT Channel Occupancy Time
CP Cyclic Prefix
CS-RNTI Configured Scheduling Radio Network Temporary Identifier
CSI Channel State Information
CSI-RS Channel State Information Reference Signal
DC Dual Connectivity
DCI Downlink Control Information
DG Dynamic Grant
DL Downlink
DMRS Demodulation Reference Signal
DRX Discontinuous Reception
E-UTRA Evolved Universal Terrestrial Radio Access
ETSI European Telecommunications Standards Institute
FBE Frame-Based Equipment
FFP Fixed Frame Period
FR Frequency Range
GC-PDCCH Group Common PDCCH
HARQ Hybrid Automatic Repeat Request
HARQ-ACK HARQ Acknowledgement
ID Identifier
IE Information Element
IIoT Industrial Internet of Things
LBE Load Based Equipment
LBT Listen Before Talk
LTE Long Term Evolution
MAC Medium Access Control
MAC CE MAC Control Element
MCG Master Cell Group
MN Master Node
MSGA Message A
MSGB Message B
NACK Negative Acknowledgment
NAS Non-Access Stratum
NDI New Data Indicator
NR New Radio
NR-U New Radio Unlicensed
NW Network
OFDM Orthogonal Frequency Division Multiplexing
PBCH Physical Broadcast Channel
PCell Primary Cell
PDCCH Physical Downlink Control Channel
PDCP Packet Data Convergence Protocol
PDSCH Physical Downlink Shared Channel
PDU Protocol Data Unit
PHY Physical (layer)
PRACH Physical Random Access Channel
PUCCH Physical Uplink Control Channel
PUSCH Physical Uplink Shared Channel
RA Random Access
RACH Random Access Channel
RAN Radio Access Network
RAR Random Access Response
RB Resource Block
RF Radio Frequency
RLAN Radio Local Area Network
RLC Radio Link Control
RMSI Remaining Minimum System Information
RNTI Radio Network Temporary Identifier
RO RACH Occasion
RRC Radio Resource Control
RS Reference Signal
RV Redundancy Version
SCell Secondary Cell
SCG Secondary Cell Group
SCS Subcarrier Spacing
SDU Service Data Unit
SIB1 System Information Block Type 1
SN Secondary Node
SR Scheduling Request
SRB Signaling Radio Bearer
SS Synchronization Signal
SSB Synchronization Signal Block
TA Timing Advance
TB Transport Block
TDD Time Division Duplex
TDRA Time Domain Resource Allocation
TR Technical Report
TS Technical Specification
UCI Uplink Control Information
UE User Equipment
UL Uplink Various efforts have been made to improve different aspects of wireless communication for cellular wireless communication systems, such as 5G NR by improving data rate, latency, reliability, and mobility. The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to FBE operation in an unlicensed band in cellular wireless communication networks.

According to an aspect of the present disclosure, a UE for FBE operation in an unlicensed band is provided. The UE includes a processor and a memory coupled to the processor. The memory stores a computer-executable program that when executed by the processor, causes the processor to receive, from a base station (BS), a first parameter indicating a first periodicity of an FFP used when the BS acts as an initiating device for the FBE operation; and receive, from the BS, a second parameter indicating a second periodicity of the FFP used when the UE acts as the initiating device for the FBE operation.

According to another aspect of the present disclosure, a method performed by a UE for FBE operation in an unlicensed band is provided. The method includes: receiving, from a BS, a first parameter indicating a first periodicity of an FFP used when the BS acts as an initiating device for the FBE operation; and receiving, from the BS, a second parameter indicating a second periodicity of the FFP used when the UE acts as the initiating device for the FBE operation.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
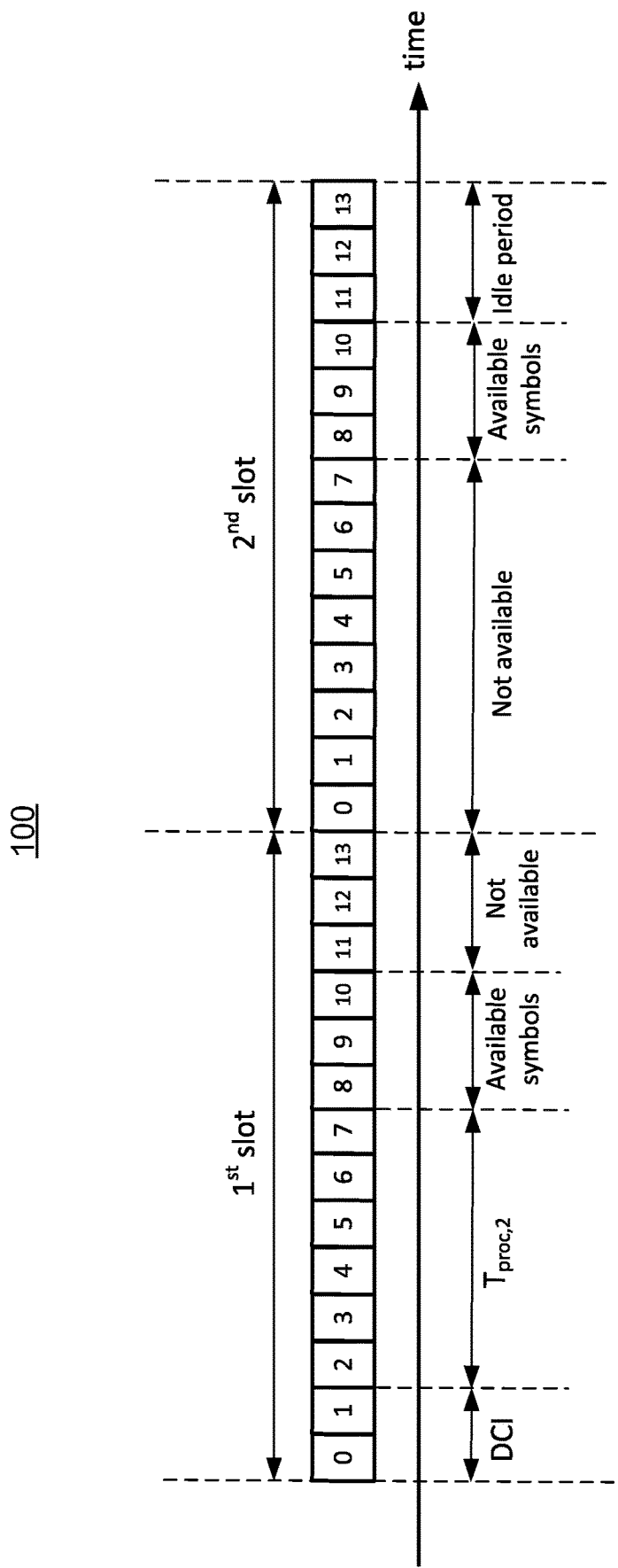
FIG. 1 illustrates a constraint on a configurable length of a CG PUSCH for an FBE operation according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising of the SpCell and optionally one or more Secondary Cells (SCells). An SCG may refer to a group of serving cells associated with the Secondary Node (SN), comprising of the SpCell and optionally one or more SCells.

As previously disclosed, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Examples of some selected terms are provided as follows.

Frame-Based Equipment (FBE): Frame Based Equipment shall implement a Listen Before Talk (LBT) based Channel Access Mechanism to detect the presence of other RLAN transmissions on an Operating Channel. Frame Based Equipment is equipment where the transmit/receive structure has a periodic timing with a periodicity equal to the Fixed Frame Period (FFP).

Clear Channel Assessment (CCA): mechanism used by an equipment to identify other transmissions in the channel.

Channel Occupancy Time (COT): The total time for which gNB/UE and any gNB/UE(s) sharing the channel occupancy perform transmission(s) on a channel after an gNB/UE performs the corresponding channel access procedures.

Configured Grant (CG): A BS (e.g., a gNB) may allocate UL resources for the initial HARQ transmissions to UEs. In NR, the gNB may dynamically allocate UL resources to UEs via UE specific RNTI (e.g., C-RNTI) on a PDCCH. A UE periodically monitors the PDCCH(s) in order to find possible grants for UL transmission. In addition to the dynamic grant (DG) mentioned previously, the gNB may preconfigure periodic UL resource on a PUSCH to the UE, which may be referred to as configured grants (CG). There are two types of CGs:

Type 1: the RRC entity may directly provide the configured UL grant (including the periodicity). The gNB may provide the configured grant (including the periodicity) via DL RRC signaling and the configured grant is valid for transmission once the configuration is received and corresponding reconfiguration is finished.

Type 2: the RRC entity may define the periodicity of the configured UL grant while PDCCH addressed to the CS-RNTI may either signal and activate or deactivate the configured UL grant. The PDCCH addressed to the CS-RNTI may indicate that the configured UL grant may be implicitly reused according to the periodicity defined by the RRC entity until the configured UL grant is deactivated. The gNB may provide the configured grant (including the periodicity) via DL RRC signaling. The configured grant may be considered valid (can be applied by the UE for transmission) once an activation signaling is received from the gNB and until a deactivation signaling is received from the gNB, where both the activation and deactivation signaling may be physical signaling. More specifically, the signaling is transmitted on the PDCCH addressed to the CS-RNTI.

In Rel-16 NR, operation in an unlicensed band is supported after completion of NR-U work item (WI). NR-U can support load-based equipment (LBE) operation mode and frame-based equipment (FBE) operation mode as specified in ETSI European standard (EN) 301 893.

In Rel-17 NR, for use cases such as IIoT, there is a need to support unlicensed operation in controlled environments, which may be an environment that contains only devices operating on the unlicensed band installed by the facility owner and where unexpected interference from other systems and/or radio access technology only sporadically happens.

In a controlled environment, FBE operation is preferred due to having lower overhead of channel sensing. Since most features introduced in Rel-16 NR-U target LBE operation, investigation on potential enhancement for FBE operation is needed for IIoT use cases in the controlled environments.

A frame-based equipment (FBE) is an equipment of which the transmission/reception structure has a periodic timing with a periodicity equal to a fixed frame period (FFP). Two types of devices are defined for FBE operation. A device that initiates a sequence of one or more transmissions is defined as an initiating device; otherwise, the device is defined as a responding device. The regulation for FBE operation is specified in ETSI EN 301 893.

To initiate a sequence of one or more transmissions, an initiating device may perform a clear channel assessment (CCA) check during a single observation slot immediately before starting transmissions on an operating channel at the start of an FFP. If the operating channel is found to be clear, the initiating device may start the transmission immediately. Otherwise, there may be no transmission on that channel during the next FFP.

An initiating device is allowed to grant authorization to one or more associated responding devices to transmit on the current operating channel within the current channel occupancy time (COT). A responding device may perform transmission without performing a CCA if the responding device receives a grant and if the transmission is initiated at most 16 μs after the last transmission by the initiating device that issued the grant.

On the other hand, the responding device may perform a CCA on the operating channel during a single observation slot within a 25 μs period, which ends immediately before the granted transmission time that is at least 16 μs later than the last transmission by the initiating device that issued the grant.

In Rel-16 NR-U, a gNB operates as an initiating device. The gNB may provide the FFP configuration via SIB1 or dedicated RRC signaling. The FFP may be restricted to values of {1 ms, 2 ms, 2.5 ms, 4 ms, 5 ms, 10 ms}. The starting positions of the FFPs within every two radio frames may start from an even radio frame and are given by i*P, where i={0, 1, . . . , 20/P-1} and P is the FFP in milliseconds. The idle period for a given SCS=ceil (minimum idle period allowed by regulations/Ts), where the minimum idle period allowed=max (5% of FFP, 100 us), Ts is the symbol duration for the given SCS, ceil(x) is the ceiling function that maps x to the least integer greater than or equal to x, and max(x, y) is the maximum function that gives the largest value among x and y. UE transmissions within an FFP may occur if DL signals/channels (e.g., PDCCH, SSB, PBCH, RMSI, GC-PDCCH, . . . ) within the FFP are detected.

A PRACH resource may be considered invalid if the PRACH resource overlaps with an idle period of an FFP when FBE operation is indicated.

For some IIoT use cases, such as machine tool and packaging machine identified in TR 22.804, a scheduling cycle is less than 1 ms. For such uses cases, configured grant (CG) with a periodicity equal to or less than 1 slot may be configured for UL data transmission. For such a scenario, there may be some constraints on the configurable length of a CG PUSCH for the FBE operation. Since the gNB is the initiating device, the UE may need to detect a DL signal before the CG PUSCH transmission in the FFP. To ensure that the CG PUSCH will not be dropped, the CG PUSCH should not be configured in the front of a slot since the FFP starts at a slot boundary and the UE may need some processing time for detecting the DL signal. In addition, the CG PUSCH should not be configured at the end of a slot since the idle period of the FFP is located at the end of the slot.

FIG. 1 illustrates a constraint on a configurable length of a CG PUSCH for an FBE operation 100 according to an example implementation of the present disclosure. The parameters used in the example illustrated in FIG. 1 include: one slot includes 14 symbols, SCS is 30 kHz, 2-symbol PDCCH in the front of a slot is used for DL signal detection, UE processing time is $T_{proc,2}$ of capability 2, which is 5.5 symbols, the idle period is 100 μs, which occupies 3 symbols, and the CG PUSCH has a periodicity of 1 slot. Description of the UE processing time $T_{proc,2}$ is specified in TS 38.214. The UE processing time $T_{proc,2}$ may have different values corresponding to UE processing capability 1 and UE processing capability 2.

Two slots are illustrated in FIG. 1, including the $1^{st}$ slot and the $2^{nd}$ slot. Each slot includes 14 symbols, and each symbol is identified by a symbol index, ranging from 0 to 13. Based on these parameters, symbol #0 and symbol #1 in the $1^{st}$ slot are used for DCI reception. Then the UE needs processing time $T_{proc,2}$ to decode the received DCI. The UE processing time $T_{proc,2}$ occupies symbol #2 through symbol #7. The idle period occupies the last three symbols, symbol #11, #12, and #13, in the $2^{nd}$ slot. These symbols (symbols #0 through #7 in the $1^{st}$ slot, symbols #11 through #13 in the $2^{nd}$ slot) are not available for UL transmission.

Because the CG PUSCH has a periodicity of 1 slot, the constraint in each slot has to be considered. Symbols #11 through #13 in the $1^{st}$ slot are also not available for UL transmission due to the idle period in the $2^{nd}$ slot, and symbols #0 through #7 in the $2^{nd}$ slot are also not available for UL transmission due to the DL signal detection and processing in the $1^{st}$ slot. Therefore, the CG PUSCH with a periodicity of 1 slot may only be configured with 3 symbols in each slot, including symbols #8, #9, and #10. The low number of symbols available for UL transmission limits the reliability of CG PUSCH and the number of UEs that can be supported.

To solve the above-mentioned technical problem, two approaches are disclosed. The first approach is to specify a timeline shorter than the $T_{proc,2}$ timeline in the existing TS. The second approach is to enable the UE to act as an initiating device. Implementations disclosed in the present disclosure are summarized as follows.

Implementation #1: DL Signal for FFP Authorization

Besides specifying a timeline for DL signal detection, the DL signal to be detected may also need to be defined clearly. Otherwise, it may not be clear whether a UE is able to detect any DL signal and transmit a configured UL transmission in an FFP, which may result in waste of resources if a gNB reserves a configured UL resource in which the UE may not be able to transmit.

Implementation #2: Indicating UE to Act as an Initiating Device

If a UE needs to act as an initiating device, a gNB may not act as an initiating device to avoid blocking the UE, and a signaling method may be required to set the UE as the initiating device.

Implementation #3: Sharing of UE Initiated COT

A gNB may configure a UE to act as an initiating device, and the periodicity of FFP of the UE when acting as the initiating device may be different from the periodicity of FFP of the gNB indicated in SIB1. Therefore, the duration of the COT may be indicated to the gNB and other UEs sharing the COT initiated by the initiating UE.

Implementation #4: Non-Slot-Based Repetition

For PUSCH with type B repetition, some transmission occasions may not be transmitted if they collide with an idle period of an FFP. In addition, if a gNB is acting as an initiating device, the transmission occasions in the front of the FFP (e.g., starting at the beginning of the FFP) may not be transmitted either. Methods may need to be specified for handling the transmission occasions, such as segmentation or dropping of the transmission occasions.

Implementation #5: PRACH Transmission

If a gNB is acting as an initiating device, a UE needs to detect a DL signal in an FFP before transmitting the PRACH in the FFP. For an FFP with a shorter periodicity, e.g., 2 ms, it is possible that some RACH occasions (RO) are in the front of the FFP (e.g., starting at the beginning of an FFP), which cannot be used by the UEs since there is not enough processing time for the UE to detect a DL signal before the RACH occasions. According to the existing TS, it is possible that for SSB-to-RO mapping, an SSB is only mapped to the ROs in the front of the FFP. Then, UEs selecting the SSB mapped to the ROs cannot perform PRACH transmission.

Figure 2:
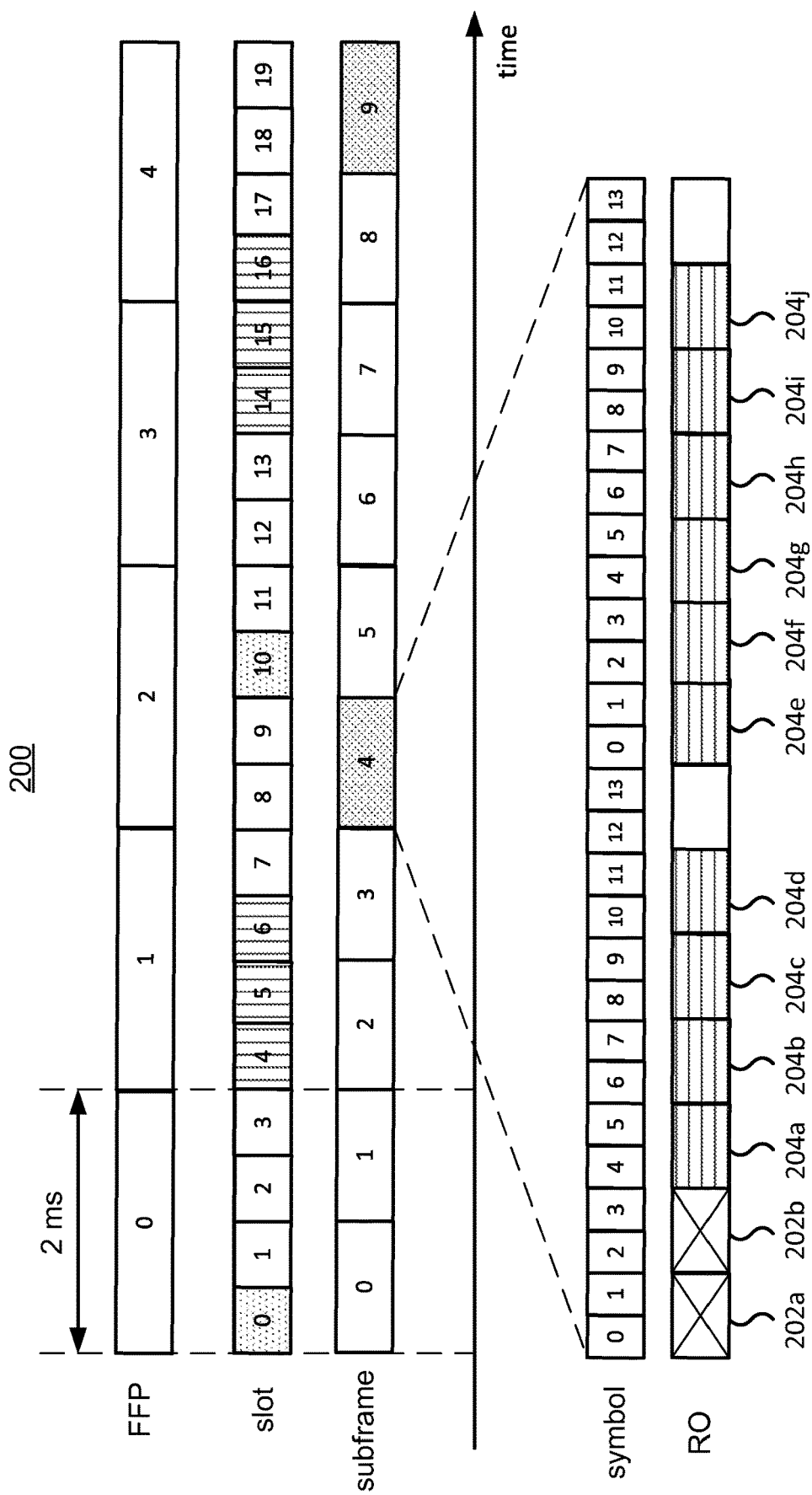
FIG. 2 illustrates RACH occasions in an FFP structure according to an example implementation of the present disclosure.

FIG. 2 illustrates RACH occasions in an FFP structure 200 according to an example implementation of the present disclosure. A system frame includes 10 subframes, and each subframe is identified by a subframe index, ranging from 0 to 9. Each subframe includes 2 slots and each slot includes 14 symbols. Each slot is identified by a slot index (ranging from 0 to 19) and each symbol is identified by a symbol index (ranging from 0 to 13 in every slot). The parameters used in the example illustrated in FIG. 2 include: SCS is 30 kHz, PRACH configuration index is 75 as specified in TS 38.211 V15.8.0 (2 RACH slots in subframe #4 and 2 RACH slots in subframe #9 in every system frame), periodicity of FFP is 2 ms, the number of SSBs is 4, ssb-perRACH-OccasionAndCB-PreamblesPerSSB is oneFourth. SS/PBCH is transmitted in slot #0 and slot #10. Type0-PDCCH is transmitted in slot #4 through slot #6 and slot #14 through slot #16.

Based on these parameters, if there are only two DL symbols in the front of slot #8, there may be 10 valid ROs in subframe #4. RO 202a and RO 202b are considered as invalid ROs because RO 202a overlaps with two DL symbols in the front of slot #8 and RO 202b overlaps with $N_{gap}$ symbols (two symbols) as specified in TS 38.213 V15.8.0. In the first RACH slot (slot #8), there are four valid ROs, including ROs 204a, 204b, 204c, and 204d. In the second RACH slot (slot #9), there are six valid ROs, including ROs 204e, 204f, 204g, 204h, 204i, and 204j. Therefore, there are ten valid ROs in subframe #4. In addition to subframe #4, subframe #9 is also used for PRACH resource. In subframe #9, all ROs may be valid except the last RO overlapping with the idle period (which corresponds to symbol #10 and symbol #11 in slot #19). Therefore, there are eleven valid ROs in subframe #9.

According to the existing TS, SSB-to-RO mapping may start at the first valid RO, which is RO 204a in symbol #4 and symbol #5 in slot #8, and the last 5 valid ROs will not be mapped since there are not enough valid ROs for another cycle of SSB-to-RO mapping. However, the UE may not be able to use the first ROs (including ROs 204a, 204b, 204c, and 204d) since DL signal detection may not be finished yet. For example, if the amount of time the UE needs for DL signal detection is $T_{proc,2}$ (capability 1), the first four valid ROs (including ROs 204a, 204b, 204c, and 204d) will not be able to be used by the UE. In other words, the UE selecting the first SSB cannot perform PRACH transmission.

Detailed description of the disclosed implementations is provided below. It should be noted although implementation details are described in implementation #1 through implementation #5, the disclosed details of embodiments/methods/signaling in different implementations may be logically combined.

Implementation #1: DL Signal for FFP Authorization

For configured UL transmissions, a gNB may configure DL signals used for authorization of the FFP. A UE may transmit a configured UL transmission if the configured DL signals used for authorization of the FFP is detected in the FFP. The gNB may configure a minimum processing time for detection of the DL signal. The UE may determine that the configured UL transmission is not transmitted if it starts within the configured minimum processing time from the end of the configured DL signal.

The DL signals may be at least one the followings:
PDCCH candidates with specific DCI formats
PBCH payload
Reference signals, such as demodulation reference signal of PDCCH, demodulation reference signal of PBCH, synchronization signals, and CSI-RS.

The DL signals may be categorized into two types. The first type is the DL signals with error detection, such as PDCCH candidates with specific DCI formats and a PBCH payload. The second type includes the reference signals that do not have error detection. The type that is used for FFP authorization may depend on the environment, e.g., whether the system may interfere other system using the same spectrum. If the signal of the system is well contained in an area, the DL signal without error detection may be used for FFP authorization; otherwise, the DL signal with error detection may be used for FFP authorization. Since the definition of detection for the two types of signals are different, the processing time needed for detection of the two types may be configured to be different.

Configuration of the DL signal for authorization may be based on the following alternatives.

In one implementation, the DL signal for authorization is configured with the associated configured UL transmission. For example, a search space index is configured in a configuredGrantConfig IE to indicate that the PDCCH candidates in the indicated search space are used for authorization of an FFP. For another example, a search space index and an indication to use DMRS is configured in the configuredGrantConfig IE to indicate that the DMRS of the indicated search space is used for authorization of the FFP.

In one implementation, the DL signal for authorization is configured with other FBE configurations. For example, a search space index is configured in a ChannelAccessMode IE to indicate that the PDCCH candidates in the indicated search space are used for authorization of an FFP. For another example, a search space index and an indication to use DMRS is configured in the ChannelAccessMode IE to indicate that the DMRS of the indicated search space is used for authorization of the FFP. The ChannelAccessMode IE may be provided via SIB1 or UE dedicated RRC signaling.

In one implementation, the DL signal for authorization is configured with other FBE configurations. Full configuration of the DL signal may be via a ChannelAccessMode IE. For example, a search space and a number of PDCCH candidates may be provided for authorization of an FFP. The UE may discard the DCI format after the DCI format is detected.

In one implementation, all DL signals configured to a UE within a time period X at the beginning of an FFP may be used for authorization of the FFP, where the time period X may be configured in a ChannelAccessMode IE.

In one implementation, all DL signals configured to a UE within a time period X at the beginning of an FFP may be used for authorization of UL transmission in a time period Y in the FFP, where the time period X and the time period Y may be configured in a ChannelAccessMode IE. In one implementation, the time period Y may be derived from the time period X, the minimum processing time of the DL signal, and the FFP periodicity. UL transmission outside of the time period Y in the FFP may be considered as invalid. An invalid resource may not be used for the following: RV cycling, SSB-to-RO mapping, UCI multiplexing, PRACH preamble of a 2 step RACH if associated PUSCH resource is invalid, etc.

When more than one DL signals are provided for authorization of the FFP, selection of the DL signal may be based on the following alternatives.

The UE uses the DL signal with the earliest ending symbol in the FFP.

The UE uses the DL signal associated with the configured UL transmission with the earliest starting symbol in the FFP.

The UE uses the DL signal provided in the SIB1 if PRACH is to be transmitted; otherwise, the UE uses the DL signal dedicatedly configured, if any.

In one implementation, any DL signal configured to a UE within a time period X at the beginning of an FFP may be selected for authorization of the FFP, where the time period X may be configured in a ChannelAccessMode IE.

In one implementation, any DL signal configured to a UE within a time period X at the beginning of an FFP may be selected for authorization of the FFP, where the time period X may be derived based on the minimum processing time for DL signal and the configured UL transmission in the FFP.

The minimum processing time may be configured based on the following alternatives.

Case #1-1: If the UE reports pdsch-ProcessingType2 or pdsch-ProcessingType2-Limited, the gNB may configure the minimum processing time for the DL signal for authorization to be $T_{proc,2}$ with UE processing capability 2; otherwise, the gNB may configure the minimum processing time to be $T_{proc,2}$ with UE processing capability 1.

Case #1-2: The UE may determine the minimum processing time to be $T_{proc,2}$ with UE processing capability 2 if processingType2Enabled in PDSCH-ServingCellConfig is configured to be TRUE; otherwise, the UE may determine the minimum processing time to be $T_{proc,2}$ with UE processing capability 1.

Case #1-3: The UE may determine the minimum processing time to be $T_{proc,2}$ with UE processing capability 2 if processingType2Enabled in PUSCH-ServingCellConfig is configured to be TRUE; otherwise, the UE may determine the minimum processing time to be $T_{proc,2}$ with UE processing capability 1.

Case #1-4: The UE may determine the minimum processing time according to Case #1-1 if explicit configuration of the minimum processing time for the DL signal for authorization is configured; otherwise, the UE may determine the minimum processing time according to Case #1-2 or Case #1-3.

Case #1-5: If the DL signal used for authorization is a reference signal, the gNB may configure the minimum processing time to be $T_{proc,d}$, where $T_{proc,d}$ may be smaller than $T_{proc,2}$ of the corresponding UE processing capability. For example, $T_{proc,d}$ may be $T_{proc,2}/2$ of the corresponding UE processing capability.

Case #1-6: If the DL signal used for authorization is a reference signal, the gNB may configure the minimum processing time to be $T_{proc,d}$, where $T_{proc,d}$ may be smaller than $T_{proc,2}$ of UE processing capability 2. For example, $T_{proc,d}$ may be $T_{proc,2}/2$ of the corresponding UE processing capability.

Case #1-7: If the DL signal used for authorization is a reference signal, the gNB may configure the minimum processing time to be $T_{proc,d}$, where $T_{proc,d}$ may be equal to $T_{proc,2}$ of UE processing capability 2.

Case #1-8: If the DL signal used for authorization is a reference signal, the UE may determine the minimum processing time to be $T_{proc,d}$ with UE processing capability 2 if processingType2Enabled in PDSCH-ServingCellConfig is configured to be TRUE, where $T_{proc,d}$ with UE processing capability 2 may be $T_{proc,2}$ (UE processing capability 2)/2; otherwise, the UE may determine the minimum processing time to be $T_{proc,d}$ with UE processing capability 1, where $T_{proc,d}$ with UE processing capability 1 may be $T_{proc,2}$ (UE processing capability 1)/2.

Case #1-9: If the DL signal used for authorization is a reference signal, the UE may determine the minimum processing time to be $T_{proc,d}$ with UE processing capability 2, where $T_{proc,d}$ with UE processing capability 2 may be $T_{proc,2}$ (UE processing capability 2)/2.

Case #1-10: If the DL signal used for authorization is a reference signal, the UE may determine the minimum processing time to be $T_{proc,d}$, where $T_{proc,d}$ with UE processing capability 2 may be equal to $T_{proc,2}$.

When the UE is configured with PDCCH candidates or a DMRS of the PDCCH for detection of authorization for the FFP, if configured UL transmission is to be transmitted, the UE may attempt to detect the DL signal regardless of whether the MAC entity is in DRX active time or not.

In one implementation, for a configured grant PUSCH, if a transmission occasion starts before symbol S, where S is the first UL symbol starting after the duration of minimum processing time from the end of the DL signal used for authorization, the transmission occasion is not used for RV cycling (e.g., RVO is not mapped to the transmission occasion) if the transmission occasion is a transmission occasion valid for the first repetition (e.g., the corresponding RV for the transmission occasion is RV0 when repK-RV is s2-0303).

Implementation #2: Indicating UE to Act as an Initiating Device

A gNB may transmit DL signaling to set the UE as an initiating device for one or more FFPs. The DL signaling may be at least one of an RRC configuration, a DCI indication, and a MAC CE indication. In one implementation, a period in which the UE acts as an initiating device may be controlled by a timer.

In one implementation, when the UE acts as the initiating device, the UE may perform a clear channel assessment (CCA) on a channel of the unlicensed band, and the UE may perform a UL transmission scheduled by a UL grant and/or a configured grant on the channel after determining that the channel is clear.

The RRC configuration may include at least one of the following parameters/IEs/configurations:

An RRC parameter for enabling the UE as the initiating device in a specific DCI format. For example, the UE may act as the initiating device when the UE performs transmission on a resource scheduled by the specific DCI format.

An RRC parameter in the configuredGrantConfig IE for enabling the UE as the initiating device using the corresponding CG PUSCH starting at the beginning of an FFP.

An RRC parameter in the configuredGrantConfigList IE for enabling the UE as the initiating device using the CG PUSCHs configured in the configuredGrantConfigList, which start at the beginning of FFPs.

An RRC parameter in an SR configuration (e.g., SchedulingRequestToAddMod or SchedulingRequestResourceConfig) to enable the UE to act as the initiating device in the FFPs that have PUCCH resources corresponding to the SR configuration, which start at the beginning of the FFPs.

An RRC configuration to add a new column for an initiating device indicator in a TDRA table of a DCI format.

An RRC configuration of the FBE operation includes a bitmap in which each bit indicates whether a corresponding FFP is initiated by the gNB or the UE.

A set of configured bitmaps, where each bit in each bitmap indicates whether an FFP is initiated by the gNB or the UE. In one implementation, a dynamic indication (e.g., DCI) may be transmitted to the UE to select one bitmap among the set of configured bitmaps.

An RRC configuration of the muting of monitoring occasions of the search spaces used for FFP authorization (implicit indication). The muting of the monitoring occasions may be an implicit indication, which instructs the UE to act as the initiating device.

A TDD configuration (e.g., tdd-UL-DL-Configuration-Common) indicates the symbols in the front of the FFPs as UL symbols.

A TDD configuration (e.g., tdd-UL-DL-Configuration-Dedicated) indicates the symbols in the front of the FFPs as UL symbols.

One or multiple UL BWPs configured as the BWP(s) on which the UE acts as the initiating device for the FBE operation. For example, the UE may be configured with multiple UL BWPs via downlink RRC signaling, and one or more UL BWPs among the multiple configured UL BWPs are indicated as the initiating device-specific BWP(s). The indication may be contained in, but not limited to, the BWP-UplinkDedicated IE. When the initiating device-specific BWP is activated (by the gNB), the UE may act as the initiating device for the PUSCH/PRACH/PUCCH transmission on the activated initiating device-specific BWP.

One or multiple serving cells configured as the cell(s) on which the UE acts as the initiating device. For example, the UE may be configured with multiple serving cells via downlink RRC signaling, and one or more cells among the multiple configured serving cells are indicated as the initiating device-specific cell(s). The indication may be contained in, but not limited to, the ServingCellConfig IE. When the initiating device-specific cell is activated (by the gNB), the UE may act as the initiating device for the PUSCH/PRACH/PUCCH transmission on the activated initiating device-specific cell.

The DCI indication may include at least one of the following fields/indication/information.

A new DCI field in the UL grant indicates the UE as the initiating device.

A TDRA field in the UL grant indicates the UE as the initiating device.

A ChannelAccess-CPext-CAPC field in the UL grant indicates the UE as the initiating device.

A specific DCI format is used for indicating the UE as the initiating device. In one implementation, the specific DCI format may be used for a group of UEs.

DCI format 2_0 includes an indicator to indicate a bitmap among a set of bitmaps. Each bit in the bitmap may indicate whether a corresponding FFP is initiated by the gNB or the UE. The DCI format 2_0 may be used for a group of UEs.

DCI format 2_0 indicates a duration in which the UE acts as the initiating device.

DCI format 2_0 includes a slot format indication indicating "UL symbol" for the symbols at the beginning of the FFPs.

DCI format 2_0 includes a slot format indication for multiple FFPs.

The MAC CE Indication

The UE may act as the initiating device upon reception of an activation MAC CE/DCI. The UE may stop acting as the initiating device upon reception of a deactivation MAC CE/DCI.

Timer

A timer may be used to define the period in which the UE acts as the initiating device. The timer may be started upon reception of a DCI/MAC CE indication. The UE may stop acting as the initiating device upon expiration of the timer.

Some implementations of the DL signaling for setting the UE as the initiating device for an FFP are disclosed below. For the following implementations, the UE may have sensed the channel to be clear/idle during the CCA period.

In one implementation, if tdd-UL-DL-Configuration-Common and/or tdd-UL-DL-ConfigurationDedicated (if configured) indicates the symbols in the front of an FFP as flexible symbols in which the UE is configured to transmit CG PUSCH, and the UE is configured to monitor DCI format 2_0 but does not detect the DCI format 2_0 for a slot format indication for the symbols in the front of the FFP, the UE may be allowed to transmit the CG PUSCH if the RRC configuration indicates to the UE to initiate the FFP, or the DCI format 2_0 includes an indicator to indicate a bitmap selected from a set of bitmaps, where the bitmap indicates whether each FFP is initiated by the gNB or the UE, and the UE has detected a bitmap indicating the FFP to be initiated by the UE.

In one implementation, if tdd-UL-DL-Configuration-Common and/or tdd-UL-DL-ConfigurationDedicated (if configured) indicates the symbols in the front of an FFP as flexible symbols in which UE is configured to transmit CG PUSCH, and the UE is configured to monitor DCI format 2_0 and detects a DCI format 2_0 for a slot format indication for the symbols in the front of the FFP, the UE is allowed to transmit the CG PUSCH if the DCI format 2_0 indicates the symbols in which the UE is configured to transmit CG PUSCH in the front of the FFP as UL symbols, and the RRC configuration indicates to the UE to initiate the FFP, or the RRC configuration indicates to the UE to initiate any FFP, or the DCI format 2_0 includes an indicator to indicate a bitmap selected from a set of bitmaps, where the bitmap indicates whether each FFP is initiated by the gNB or the UE, and the UE has detected a bitmap indicating the FFP to be initiated by the UE.

In one implementation, if tdd-UL-DL-Configuration-Common and/or tdd-UL-DL-ConfigurationDedicated (if configured) indicates the symbols in the front of an FFP as flexible symbols in which the UE is configured to transmit CG PUSCH, and the UE is configured to monitor DCI format 2_0 and detects a DCI format 2_0 for a slot format indication for the symbols in the front of the FFP, the UE may be allowed to transmit the CG PUSCH if the DCI format 2_0 indicates the symbols in which UE is configured to transmit CG PUSCH in the front of the FFP as UL symbols, and an RRC parameter is configured in configuredGrantConfig and is set to enable the UE as the initiating device for transmission of the corresponding CG PUSCH starting at the beginning of FFPs.

In one implementation, if tdd-UL-DL-Configuration-Common and/or tdd-UL-DL-ConfigurationDedicated (if configured) indicates the symbols in the front of an FFP as UL symbols or flexible symbols in which UE is configured to transmit CG PUSCH, and the UE is not configured to monitor the DCI format 2_0, the UE may be allowed to transmit the CG PUSCH if the RRC configuration indicates to the UE to initiate the FFP, where the RRC configuration may include an RRC parameter configured in configuredGrantConfig for enabling the UE as the initiating device for transmission of the corresponding CG PUSCH starting at the beginning of FFPs, or a bitmap in which each bit indicates whether an FFP is initiated by the gNB or the UE.

In one implementation, if tdd-UL-DL-Configuration-Common and tdd-UL-DL-ConfigurationDedicated are not provided to the UE, and the UE is not configured to monitor the DCI format 2_0, the UE may be allowed to transmit a CG PUSCH in the front of an FFP if the RRC configuration indicates to the UE to initiate the FFP, where the RRC configuration may include an RRC parameter configured in configuredGrantConfig for enabling the UE as the initiating device for transmission of the corresponding CG PUSCH starting at the beginning of FFPs, or a bitmap in which each bit indicates whether an FFP is initiated by the gNB or the UE.

In one implementation, if tdd-UL-DL-Configuration-Common and/or tdd-UL-DL-ConfigurationDedicated (if configured) indicates the symbols in the front of an FFP as UL symbols in which the UE is configured to transmit CG PUSCH, and the UE is configured to monitor the DCI format 2_0 but does not detect the DCI format 2_0 for a slot format indication for the symbols in the front of the FFP, the UE may be allowed to transmit the CG PUSCH if the RRC configuration indicates to the UE to initiate the FFP, or the RRC configuration indicates to the UE to initiate any FFP, or the DCI format 2_0 does not include an indicator to indicate a bitmap selected from a set of bitmaps, where the bitmap indicates whether each FFP is initiated by the gNB or the UE.

In one implementation, if tdd-UL-DL-Configuration-Common and/or tdd-UL-DL-ConfigurationDedicated (if configured) indicates the symbols in the front of an FFP as UL symbols in which the UE is configured to transmit CG PUSCH, and the UE is configured to monitor the DCI format 2_0 and detects the DCI format 2_0 for a slot format indication for the symbols in the front of the FFP, the UE may be allowed to transmit the CG PUSCH if the RRC configuration indicates to the UE to initiate the FFP, or the RRC configuration indicates to the UE to initiate any FFP, or the DCI format 2_0 includes an indicator to indicate a bitmap selected from a set of bitmaps, where the bitmap indicates whether each FFP is initiated by the gNB or the UE, and the UE has detected a bitmap indicating the FFP to be initiated by the UE.

In one implementation, if tdd-UL-DL-Configuration-Common and/or tdd-UL-DL-ConfigurationDedicated (if configured) indicates a set of symbols in an FFP as flexible symbols in which the UE is configured to transmit CG PUSCH not starting at the start of the FFP, and the UE is configured to monitor the DCI format 2_0 but does not detect the DCI format 2_0 for a slot format indication for the set of symbols in the FFP, the UE may be allowed to transmit the CG PUSCH if there are no monitoring occasions of the search space for the DCI format 2_0 with ending symbol ending before $T_{proc,2}$ from the start of the CG PUSCH.

In one implementation, the UE may be allowed to initiate an FFP using a PRACH preamble starting at the beginning of the FFP if the SIB1 includes an RRC configuration indicating that the FFP is to be initiated by the UE.

In one implementation, the UE may be allowed to transmit a PUSCH configured in MsgA-PUSCH-Resource without detecting a DL signal in an FFP if the UE has initiated the FFP using the PRACH preamble associated with the PUSCH.

In one implementation, if the UE has set the selected RA TYPE as 2-stepRA and has transmitted a PRACH preamble of an MSGA in an FFP, the UE may act as an initiating device for another FFP for transmission of the corresponding PUSCH of the MSGA if the resource configured in MsgA-PUSCH-Resource is at the beginning of the another FFP.

In one implementation, a RAR includes an indication indicating that the UE acts as an initiating device in an FFP with the PUSCH scheduled by the RAR.

In one implementation, if at least one SR has been triggered at an SR configuration and pending at a UE (in FFP #i, where i is an integer), the UE may perform SR transmission on a valid PUCCH resource for the SR configuration in the subsequent FFP (e.g., FFP #i+1) when one or multiple of the following conditions are satisfied:

the network has indicated to the UE to act as an initiating device in the FFP that includes the PUCCH resource corresponding to the SR configuration;

the network has indicated to the UE to act as an initiating device whenever the UE has an SR triggered from the corresponding SR configuration; and the UE has sensed the channel to be clear/idle (during the CCA in the FFP #i).

In one implementation, the indication may be provided via RRC signaling (e.g., SchedulingRequestResourceConfig).

If the UE's CG PUSCH transmission is on all resource blocks of an RB set, for the first such UL transmission, the UE may randomly determine a duration of a cyclic prefix extension to be applied for transmission from a set of values configured by cg-StartingFullBW-InsideCOT if the first such UL transmission is within a channel occupancy initiated by the gNB or the UE. On the other hand, the UE may determine a cyclic prefix extension of 0 to be applied for transmission if the first such UL transmission is not within the channel occupancy initiated by the gNB or the UE.

If the UE's CG PUSCH transmission is on fewer than all resource blocks of an RB set, for the first such UL transmission, the UE may randomly determine a duration of a cyclic prefix extension to be applied for transmission from a set of values configured by cg-StartingPartialBW-InsideCOT if the first such UL transmission is within a channel occupancy initiated by the gNB or the UE. On the other hand, the UE may determine a cyclic prefix extension of 0 to be applied for transmission if the first such UL transmission is not within the channel occupancy initiated by the gNB or by the UE.

To avoid a UE initiating an FFP from blocking a neighbor gNB initiating another FFP with the same starting time of channel occupancy time, the gNB may configure a maximum TA in the configuredGrantConfig IE. If the UE determines that its current TA is larger than the maximum TA, the UE does not initiate an FFP by a CG PUSCH transmission.

Implementation #3: Sharing of UE Initiated COT

Since the UE may change the periodicity of FFP every 200 ms according to the ETSI EN 301 893, the following implementations may be used for indicating to the gNB the periodicity of FFP used by the UE (when initiating an FFP).

In one implementation, if the UE initiates a COT for a CG PUSCH, the UE may indicate the periodicity of FFP in a CG-UCI. In one implementation, all values of periodicity specified in the 3GPP TS may be selected by the UE. In one implementation, the gNB may configure a subset of periodicity that may be selected by the UE, and the UE may select the periodicity to be used from the subset and indicate the value of the selected periodicity to the gNB. The configuration indicating the subset of periodicity may be provided to the UE via broadcast or dedicated RRC signaling. The configuration may be specific to an LBT BW, an UL BWP, a cell, or a cell group, etc. For example, the configuration may be provided in BWP-Uplink if it is UL BWP-specific. The configuration may be provided in UplinkConfig if it is cell-specific.

In one implementation, the gNB may configure the periodicity of FFP used when UE acts as the initiating device. In one implementation, the gNB may configure another periodicity of FFP used when the gNB acts as the initiating device. The configuration that indicates the periodicity of FFP may be provided to the UE via broadcast or dedicated RRC signaling. The configuration may be specific to an LBT BW, an UL BWP, a cell, or a cell group, etc. For example, the configuration may be provided in BWP-Uplink if it is UL BWP-specific. The configuration may be provided in UplinkConfig if it is cell-specific.

In one implementation, if the UE initiates a COT for a DG PUSCH, the UE may use the same periodicity of an FFP as the value indicated in the CG-UCI of the last transmitted CG PUSCH. In one implementation, if there was no CG PUSCH transmission before the DG PUSCH transmission, the UE may use the periodicity that the gNB broadcasts in the SIB1.

In one implementation, the gNB may broadcast multiple periodicities (e.g., via the SIB1). Each of the periodicities may be applied for each of the configured UL BWPs or serving cells respectively. When a UL BWP is activated, the FFP period may be set to the periodicity associated with the activated UL BWP.

In one implementation, if the UE initiates a COT for a DG PUSCH, the UE may use the periodicity of an FFP indicated in the UL grant. In one implementation, the periodicity of the FFP indicated in the UL grant may be chosen from the values reported by the UE as part of UE capability.

In one implementation, if the UE initiates a COT for a DG PUSCH, the UE may indicate the periodicity of the FFP in a MAC CE.

To share the COT initiated by the UE with other UEs, the gNB may indicate the CO duration in the DCI format 2_0 for sharing the remaining COT with other UEs. The DCI format 2_0 may be a group-common DCI format. For the other UEs, to determine the remaining COT, the indication of the CO duration in the DCI format 2_0 may take precedence over the information of the FFP indicated in the SIB1. For UEs not initiating an FFP, if the DCI format 2_0 provides the CO duration indication, the UE may determine the remaining COT based on the CO duration indication. If the DCI format 2_0 does not provide the CO duration indication, the UE may determine the remaining COT based on the FFP configuration provided in the SIB1. For UEs initiating an FFP, the remaining COT may be determined based on the periodicity of the FFP indicated to gNB as disclosed previously.

In one implementation, the UE may transmit a signal for authorization of the FFP, and other UEs may be configured to detect the signal.

A channel occupancy initiated by the UE and shared with the gNB and other UE(s) may satisfy the following:

The UE may transmit a UL transmission burst(s) starting at the beginning of the COT immediately after sensing the channel to be idle for at least a sensing slot duration $T\_sl=9$ µs. If the channel is sensed to be busy, the UE may not perform any transmission during the current COT.

The UE may transmit an UL transmission burst(s) within the COT immediately after sensing the channel to be idle for at least a sensing slot duration $T\_sl=9$ µs if the gap between the UL transmission burst(s) and any previous transmission burst is more than 16 µs.

The UE may transmit an UL transmission burst(s) after DL transmission burst(s) within the COT without sensing the channel if the gap between the UL and DL transmission bursts is at most 16 µs.

The gNB may transmit DL transmission burst(s) after UL transmission burst(s) within the COT as follows: If the gap between the DL and UL transmission bursts is at most 16 µs, the gNB may transmit DL transmission burst(s) after an UL transmission burst(s) within the channel occupancy time without sensing the channel. If the gap between the DL and UL transmission bursts is more than 16 µs, the gNB may transmit DL transmission burst(s) after an UL transmission burst(s) within the COT after sensing the channel to be idle for at least a sensing slot duration $T\_sl=9$ µs before transmission.

The gNB may transmit DL transmission burst(s) after DL transmission burst(s) within the COT as follows: The gNB may transmit a DL transmission burst(s) within the COT immediately after sensing the channel to be idle for at least a sensing slot duration T_sl=9 μs if the gap between the DL transmission burst(s) and any previous DL transmission burst is more than 16 μs.

The other UE may transmit UL transmission burst(s) after DL transmission burst(s) within the COT as follows: If the gap between the UL and DL transmission bursts is at most 16 μs, the other UE may transmit UL transmission burst(s) after a DL transmission burst(s) within the COT without sensing the channel. If the gap between the UL and DL transmission bursts is more than 16 μs, the other UE may transmit UL transmission burst(s) after a DL transmission burst(s) within the COT after sensing the channel to be idle for at least a sensing slot duration T_sl=9 μs before transmission.

The other UE may transmit UL transmission burst(s) after UL transmission burst(s) within the COT as follows: If the gap between the UL and UL transmission bursts is at most 16 μs, the other UE may transmit UL transmission burst(s) after a DL transmission burst(s) within the COT without sensing the channel. If the gap between the UL and UL transmission bursts is more than 16 μs, the other UE may transmit UL transmission burst(s) after a DL transmission burst(s) within the COT after sensing the channel to be idle for at least a sensing slot duration T_sl=9 μs before transmission.

In one implementation, "the UE may transmit UL transmission burst(s) after DL transmission burst(s) within the COT without sensing the channel if the gap between the UL and DL transmission bursts is at most 16 μs" may be realized by CP extension, such as including "N OFDM symbol (OS)-16 μs-TA" as a candidate CP extension value in cg-StartingFullBW-InsideCOT or cg-StartingPartialBW-InsideCOT for CG PUSCH transmission after DL transmission burst, where N may be a positive integer greater than or equal to 1.

Implementation #4: Non-Slot-Based Repetition

If the gNB acts as an initiating device, the gNB may configure the number of symbols (or slots) in the front of an FFP that are not used for PUSCH repetition. In addition, the UE may determine that the symbols (or slots) overlapping with the idle period of an FFP are not used for PUSCH repetition type B.

In one implementation, the number of symbols (or slots) in the front of the FFP that are not used for PUSCH repetition type B may be explicitly configured for each FFP.

It should be noted that the number of symbols (or slots) in the front of the FFP that are not used for PUSCH repetition may be pre-configured per BWP or serving cell by the gNB via downlink RRC signaling.

In one implementation, the number of symbols in the front of the FFP that are not used for PUSCH repetition type B may be determined from the DL signals used for FFP authorization and the corresponding minimum processing time for detecting the DL signals configured by the gNB.

In one implementation, a nominal repetition may be segmented around the symbols not used for PUSCH repetition type B, where the symbols not used for PUSCH repetition type B may include the symbols in the front of the FFP, DL symbols indicated by tdd-UL-DL-ConfigurationCommon, invalid symbols indicated by InvalidSymbolPattern as specified in TS 38.214 v16.1.0, and symbols overlapping with the idle period of the FFP.

In one implementation, a nominal repetition may be segmented around the symbols not used for PUSCH repetition type B, where the symbols not used for PUSCH repetition type B may include the number of symbols in the front of the FFP explicitly configured by the gNB, DL symbols indicated by tdd-UL-DL-ConfigurationCommon, invalid symbols indicated by InvalidSymbolPattern as specified in TS 38.214 v16.1.0, and symbols overlapping with the idle period of the FFP.

In one implementation, an actual repetition is not transmitted if it overlaps with the symbols not used for PUSCH repetition, where an actual repetition is determined by the UE segmenting a nominal repetition around semi-static DL symbols and invalid symbols.

In one implementation, an actual repetition is not transmitted if it conflicts with DL symbols or flexible symbols indicated by the DCI format 2_0, or if it is not after a UE processing time duration from the end of the DL signal used for FFP authorization.

In one implementation, the number of symbols in the front of the FFP not used for PUSCH repetition type B is configured by InvalidSymbolPattern.

In one implementation, the number of symbols in the front of the FFP not used for PUSCH repetition type B is configured by InvalidSymbolPattern2. If a symbol is configured as invalid by InvalidSymbolPattern or InvalidSymbolPattern2, the symbol is considered invalid.

In one implementation, the UE does not apply InvalidSymbolPattern2 for the FFPs in which the UE is indicated to initiate the FFPs. The indication of initiating the FFPs may be via UL grant or RRC configuration according to Implementation #3.

Implementation #5: PRACH Transmission

The gNB may configure the DL signals used for FFP authorization and the corresponding minimum processing time for detecting the DL signals.

For SSB-to-RO mapping, if a RO overlaps the symbols within the configured minimum processing time from the end of the DL signal used for FFP authorization, the UE does not consider the RO for SSB-to-RO mapping. The ROs overlapping with the idle period of an FFP are not used for SSB-to-RO mapping either.

Configuration of the DL signal and the corresponding minimum processing time for detecting the DL signals used for FFP authorization may be based on Implementation #1.

In one implementation, the UE may determine Type0-PDCCH search space and an SSB associated with the ROs in an FFP to be the DL signal used for authorization of the FFP.

In one implementation, DL signal and the corresponding minimum processing time may be provided by the SIB1 for contention-based random access (CBRA).

In one implementation, DL signal and the corresponding minimum processing time may be provided by dedicated RRC signaling for contention-free random access (CFRA).

In addition to the methods disclosed in Implementation #1, for determination of the minimum processing time, the UE may use the SCS of the smallest SCS configuration between the SCS configuration of the DL signal used for FFP authorization and the SCS configuration of the corresponding PRACH transmission.

For PRACH transmission, the UE may transmit in an RO in an FFP if the DL signal is detected in the FFP.

In one implementation, if the UE needs longer time for DL signal detection than the configured minimum processing time, the UE does not transmit on the RO within the UE processing time for DL signal detection. For example, when the minimum processing time is configured as $T_{proc,2}$ with UE processing capability 2, but the UE needs $T_{proc,2}$ with UE processing capability 1 for DL signal detection.

The UE may transmit in the first RO in an FFP if the UE is indicated to initiate an FFP by PRACH transmission based on the methods disclosed in Implementation #2. For SSB-to-RO mapping, only ROs in the front of FFPs may be used.

In one implementation, the gNB may provide all UEs with the configuration of the FFPs to be initiated by PRACH transmission from the UEs. For SSB-to-RO mapping, the UE may use the ROs in the front of the FFPs configured to be initiated by PRACH transmission from the UEs, and the ROs that do not fall within the minimum processing time from the end of the DL signals used for FFP authorization in the FFPs configured or indicated to be initiated by gNB.

In one implementation, for SSB-to-RO mapping, the gNB may configure a sequence of numbers, where each number indicates the number of symbols in the front of an FFP that are not used for SSB-to-RO mapping. The sequence of numbers may be applied repeatedly to consecutive FFPs. Configuration of the numbers may be based on configuration of the DL signals in the front of the FFPs.

In one implementation, for SSB-to-RO mapping, the gNB may configure an invalid symbol pattern. The invalid symbol pattern may be a bitmap, where each bit of the bitmap may indicate whether a symbol is valid or invalid. The length of the symbol may be based on the SCS of the PRACH transmission. The invalid symbol pattern takes into account the processing time for DL signal detection and the idle period of the FFP.

In one scenario, multiple UEs intend to initiate an FFP by a PUSCH and a PRACH. To avoid the UEs transmitting the PRACH from being blocked by UEs transmitting the PUSCH, the following method may be used. In one implementation, when a UE initiates an FFP by PRACH transmission, the UE may transmit a PRACH starting at the beginning of the COT after sensing the channel to be clear/idle for at least a sensing slot duration $T\_sl=9$ μs, where the sensing slot ends before a configured time duration from the beginning of the COT. If the channel is sensed to be busy, the UE may not perform any transmission during the current COT.

Figure 3:
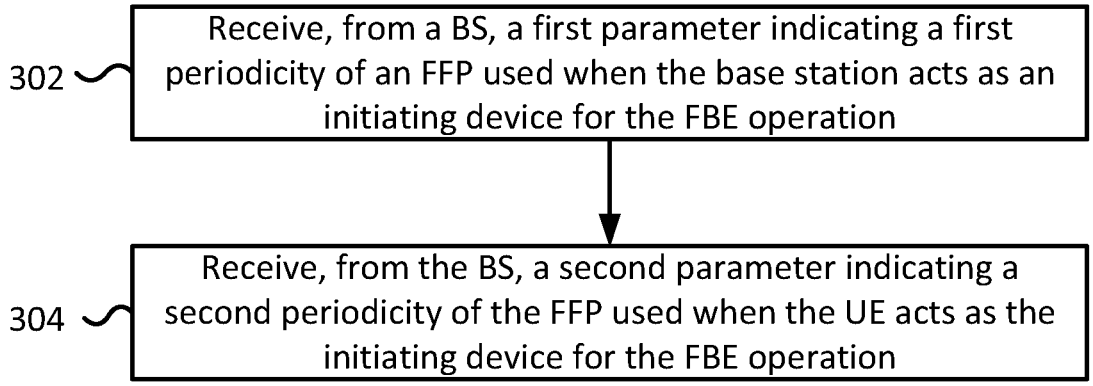
FIG. 3 illustrates a method for an FBE operation in an unlicensed band according to an example implementation of the present disclosure.

FIG. 3 illustrates a method 300 for an FBE operation in an unlicensed band according to an example implementation of the present disclosure. In action 302, the UE receives, from a BS, a first parameter indicating a first periodicity of FFP used when the BS acts as an initiating device for the FBE operation. In action 304, the UE receives, from the BS, a second parameter indicating a second periodicity of FFP used when the UE acts as the initiating device for the FBE operation. The first periodicity of FFP may be independent from the second periodicity of FFP. By separately providing the first periodicity of FFP for BS-initiated COT and the second periodicity of FFP for UE-initiated COT, the BS (e.g., a gNB) has flexibility in setting different FFP periods for BS-initiated COT and UE-initiated COT. The BS can, therefore, determine appropriate FFP values corresponding to different scenarios in which either the BS acts as the initiating device or the UE acts as the initiating device.

The BS may provide the first parameter via either broadcast or dedicated RRC signaling in action 302. The BS may also provide the second parameter via either broadcast or dedicated RRC signaling in action 304. In one implementation, the UE may receive the first parameter and the second parameter via dedicated RRC signaling.

Figure 4:
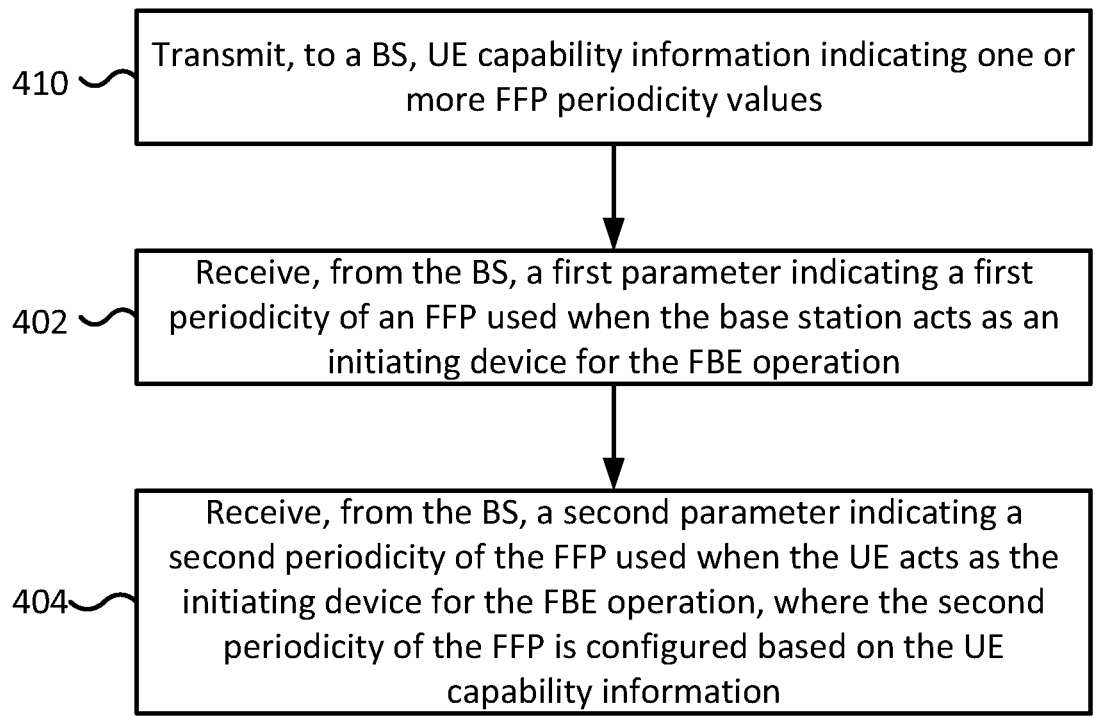
FIG. 4 illustrates a method for configuring FFP values based on UE capability according to an example implementation of the present disclosure.

FIG. 4 illustrates a method 400 for configuring FFP values based on UE capability according to an example implementation of the present disclosure. In action 410, the UE transmits, to a BS, UE capability information indicating one or more FFP periodicity values. The UE capability information may indicate multiple FFP periodicity values supported by the UE when the UE acts as the initiating device for the FBE operation. In action 402, the UE receives, from the BS, a first parameter indicating a first periodicity of FFP used when the base station acts as an initiating device for the FBE operation. In action 404, the UE receives, from the BS, a second parameter indicating a second periodicity of FFP used when the UE acts as the initiating device for the FBE operation. The second periodicity of FFP may be configured based on the UE capability information. In one implementation, the value of the second periodicity of FFP may be selected from the one or more FFP periodicity values indicated in the UE capability information. The BS selects one of the multiple FFP periodicity values supported by the UE and provides the second parameter to the UE accordingly.

Figure 5:
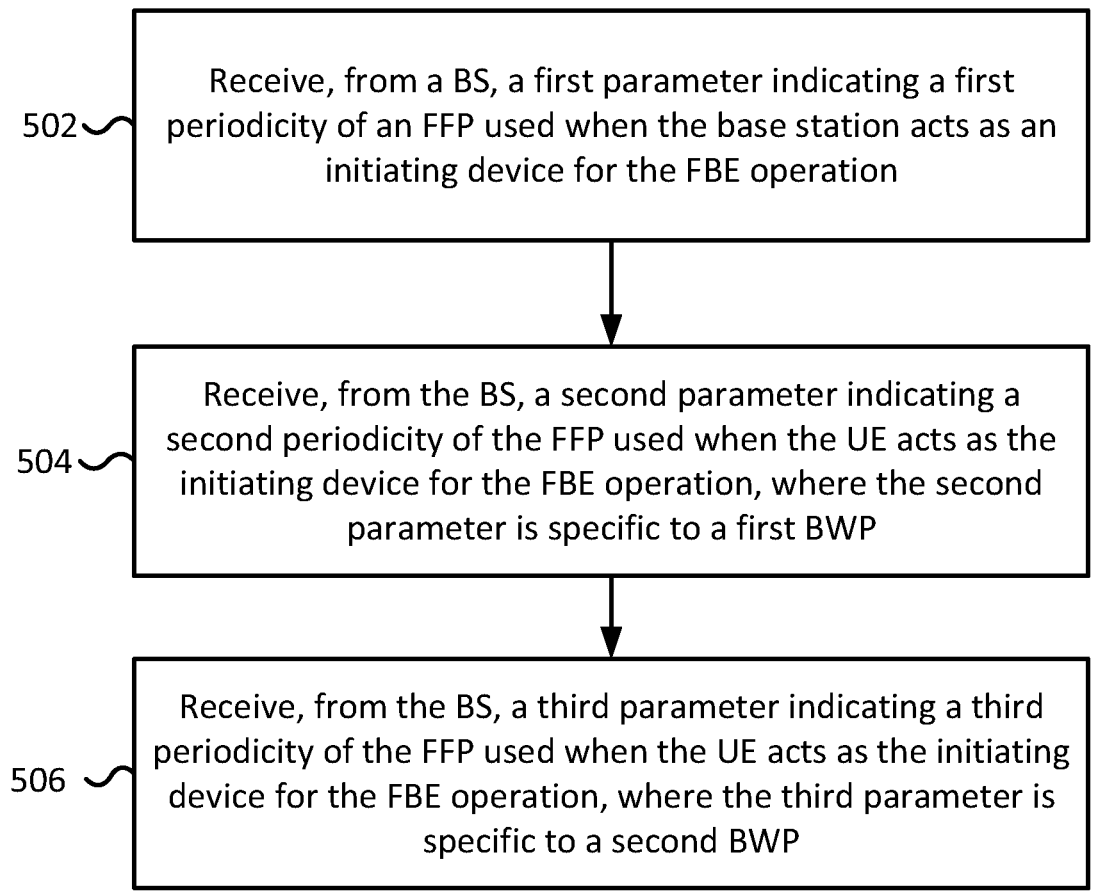
FIG. 5 illustrates a method for configuring BWP-specific FFP values for the FBE operation according to an example implementation of the present disclosure.

FIG. 5 illustrates a method 500 for configuring BWP-specific FFP values for the FBE operation according to an example implementation of the present disclosure. In action 502, the UE receives, from a BS, a first parameter indicating a first periodicity of FFP used when the base station acts as an initiating device for the FBE operation. In action 504, the UE receives, from the BS, a second parameter indicating a second periodicity of FFP used when the UE acts as the initiating device for the FBE operation, where the second parameter is specific to a first BWP (e.g., a first UL BWP). In action 506, the UE receives, from the BS, a third parameter indicating a third periodicity of FFP used when the UE acts as the initiating device for the FBE operation, where the third parameter is specific to a second BWP (e.g., a second UL BWP). Therefore, the UE may apply different FFP values when the UE acts as the initiating device for the FBE operation on different BWPs.

Figure 6:
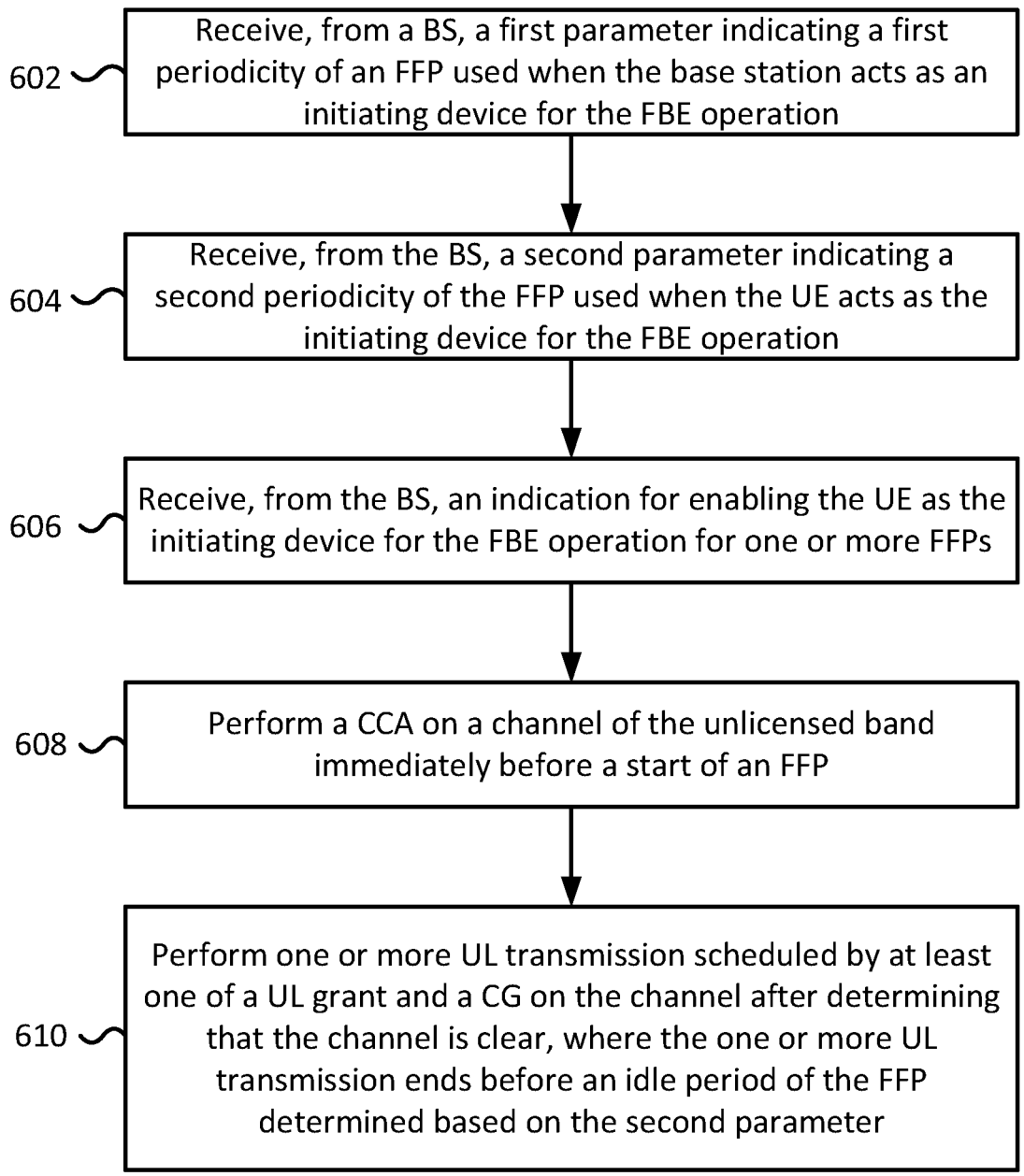
FIG. 6 illustrates a method performed by a UE for initiating an FFP according to an example implementation of the present disclosure.

FIG. 6 illustrates a method 600 performed by a UE for initiating an FFP according to an example implementation of the present disclosure. Action 602 and action 604 may correspond to action 302 and action 304 illustrated in FIG. 3, respectively. In action 606, the UE receives, from the BS, an indication for enabling the UE as the initiating device for the FBE operation for one or more FFPs. In action 608, the UE performs a CCA on a channel of the unlicensed band immediately before a start of an FFP. The UE may sense the channel to determine whether the channel is busy or idle/clear. In action 610, the UE performs one or more UL transmission scheduled by at least one of an UL grant and a CG on the channel after determining that the channel is clear. The scheduled UL transmission in action 610 may include one or more UL transmission on DG PUSCH resource(s) and/or one or more UL transmission on CG PUSCH resource(s). The one or more UL transmission ends before an idle period of the FFP determined based on the second parameter.

In one implementation, the UE may receive the indication in action 606 via an RRC configuration. In one implementation, the RRC configuration may include at least one of a CG configuration, an SR configuration, and a TDD configuration. In one implementation, the RRC configuration may include a bitmap, where each bit of the bitmap indicates whether a corresponding FFP is initiated by the UE or the BS. In one implementation, the RRC configuration may indicate at least one of a BWP and a cell on which the UE acts as the initiating device for the FBE operation.

In one implementation, the UE may receive the indication in action 606 via a DCI format. In one implementation, the DCI format may be the UL grant including a specific field for carrying the indication. In one implementation, the specific field may be one of a TDRA field and a ChannelAccess-CPext-CAPC field. In one implementation, the DCI format may be DCI format 2_0 for a group of UEs. The DCI format 2_0 may include a slot format indicator indicating UL symbols at the beginning of the FFP.

Figure 7:
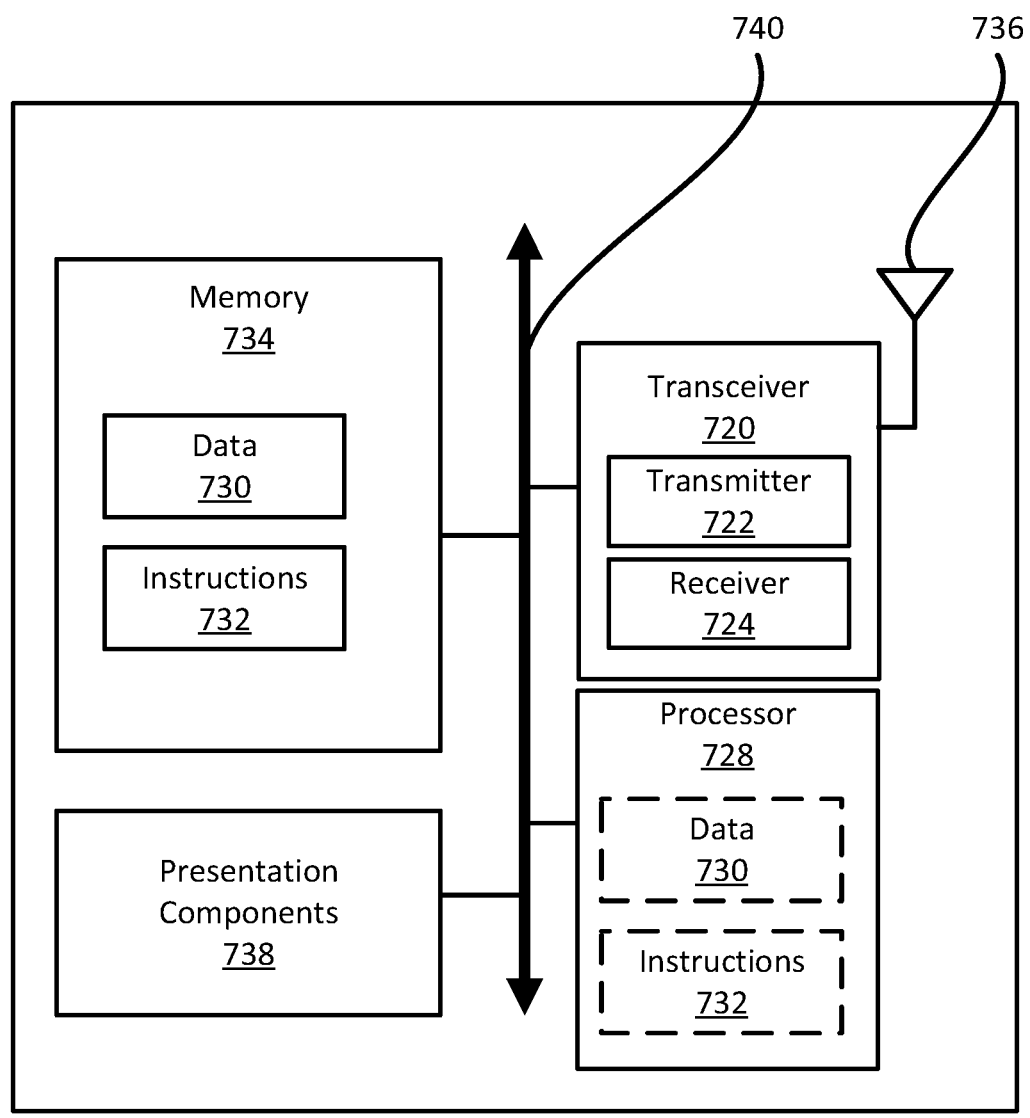
FIG. 7 is a block diagram illustrating a node for wireless communication according to an example implementation of the present disclosure.

FIG. 7 is a block diagram illustrating a node 700 for wireless communication according to an example implementation of the present disclosure. As illustrated in FIG. 7, the node 700 may include a transceiver 720, a processor 728, a memory 734, one or more presentation components 738, and at least one antenna 736. The node 700 may also include a radio frequency (RF) spectrum band module, a BS communications module, a network communications module, and a system communications management module, Input/Output (I/O) ports, I/O components, and a power supply (not illustrated in FIG. 7).

Each of the components may directly or indirectly communicate with each other over one or more buses 740. The node 700 may be a UE or a BS that performs various functions disclosed with reference to FIGS. 1 through 6.

The transceiver 720 has a transmitter 722 (e.g., transmitting/transmission circuitry) and a receiver 724 (e.g., receiving/reception circuitry) and may be configured to transmit and/or receive time and/or frequency resource partitioning information. The transceiver 720 may be configured to transmit in different types of subframes and slots including but not limited to usable, non-usable and flexibly usable subframes and slot formats. The transceiver 720 may be configured to receive data and control channels.

The node 700 may include a variety of computer-readable media. Computer-readable media may be any available media that may be accessed by the node 700 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 734 may include computer-storage media in the form of volatile and/or non-volatile memory. The memory 734 may be removable, non-removable, or a combination thereof. Example memory may include solid-state memory, hard drives, optical-disc drives, etc. As illustrated in FIG. 7, the memory 734 may store computer-readable, computer-executable instructions 732 (e.g., software codes) that are configured to cause the processor 728 to perform various functions disclosed herein, for example, with reference to FIGS. 1 through 6. Alternatively, the instructions 732 may not be directly executable by the processor 728 but be configured to cause the node 700 (e.g., when compiled and executed) to perform various functions disclosed herein.

The processor 728 (e.g., having processing circuitry) may include an intelligent hardware device, e.g., a Central Processing Unit (CPU), a microcontroller, an ASIC, etc. The processor 728 may include memory. The processor 728 may process the data 730 and the instructions 732 received from the memory 734, and information transmitted and received via the transceiver 720, the base band communications module, and/or the network communications module. The processor 728 may also process information to be sent to the transceiver 720 for transmission via the antenna 736 to the network communications module for transmission to a core network.

One or more presentation components 738 may present data indications to a person or another device. Examples of presentation components 738 may include a display device, a speaker, a printing component, and a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE) for frame-based equipment (FBE) operation in an unlicensed band, the UE comprising:
   at least one processor; and
   at least one memory coupled to the at least one processor, wherein the at least one memory stores computer-executable instructions that, when executed by the processor, cause the UE to:
   receive, from a base station (BS), a first parameter indicating a first periodicity of a first plurality of fixed frame periods (FFPs) used when the BS acts as an initiating device for the FBE operation in a cell;
   receive, from the BS, a first Radio Resource Control (RRC) configuration, the first RRC configuration including a second parameter indicating a second periodicity of a second plurality of FFPs used when the UE acts as the initiating device for the FBE operation in the cell;
   receive, from the BS, an indication for enabling the UE to act as the initiating device for the FBE operation for a first one of the second plurality of FFPs in the cell;
   perform a clear channel assessment (CCA) on a channel of the unlicensed band immediately before a start of the first one of the second plurality of FFPs in response to receiving the indication; and perform an uplink (UL) transmission on the channel to initiate the first one of the second plurality of FFPs after determining that the channel is clear, wherein:
the UL transmission ends before an idle period of the first one of the second plurality of FFPs determined based on the second parameter,
in a case that the UL transmission is scheduled by a UL grant, the indication is indicated by a ChannelAccess-CPext-CAPC field in a Downlink Control Information (DCI) format carrying the UL grant, and the DCI format is received in one of the first plurality of FFPs.

2. The UE of claim 1, wherein the first parameter and the second parameter are received via dedicated RRC signaling.

3. The UE of claim 1, wherein the computer-executable instructions, when executed by the processor, further cause the UE to:
transmit, to the BS, UE capability information indicating one or more FFP periodicity values,
wherein the second periodicity is configured based on the UE capability information.

4. The UE of claim 1, wherein the computer-executable instructions, when executed by the processor, further cause the UE to:
receive, from the BS, a third parameter indicating a third periodicity of a third plurality of FFPs used when the UE acts as the initiating device for the FBE operation in the cell, wherein:
the second parameter is specific to a first bandwidth part (BWP); and
the third parameter is specific to a second BWP.

5. The UE of claim 1, wherein:
in a case that the UL transmission is scheduled by a configured grant (CG) configuration and a DCI format 2_0 is received, the indication is indicated by the CG configuration, a time division duplex (TDD) configuration, and the DCI format 2_0,
the CG configuration indicates the UL transmission within a number of symbols in front of the first one of the second plurality of FFPs,
the TDD configuration indicates the number of symbols as UL symbols or flexible symbols, and
the DCI format 2_0 indicates the number of symbols as UL symbols.

6. The UE of claim 5, wherein
the DCI format 2_0 includes a slot format indication that indicates a slot format for multiple FFPs of the second plurality of FFPs including the first one of the second plurality of FFPs.

7. The UE of claim 1, wherein the indication is received via a second RRC configuration that includes a bitmap, each bit of the bitmap indicating whether a corresponding FFP is initiated by the UE or the BS.

8. The UE of claim 1, wherein the indication is received via a second RRC configuration that indicates at least one of a bandwidth part (BWP) and the cell on which the UE acts as the initiating device for the FBE operation.

9. The UE of claim 1, wherein:
in a case that the UL transmission is scheduled by a random access response (RAR), the indication is indicated by the RAR.

10. The UE of claim 1, wherein:
in a case that the UL transmission is scheduled by a configured grant (CG) configuration and a DCI format 2_0 is not received, the indication is indicated by the CG configuration and a time division duplex (TDD) configuration,
the CG configuration indicates the UL transmission within a number of symbols in front of the first one of the second plurality of FFPs, and
the TDD configuration indicates the number of symbols as UL symbols or flexible symbols.

11. A method performed by a user equipment (UE) for frame-based equipment (FBE) operation in an unlicensed band, the method comprising:
receiving, from a base station (BS), a first parameter indicating a first periodicity of a first plurality of fixed frame periods (FFPs) used when the BS acts as an initiating device for the FBE operation in a cell;
receiving, from the BS, a first Radio Resource Control (RRC) configuration, the first RRC configuration including a second parameter indicating a second periodicity of a second plurality of FFPs used when the UE acts as the initiating device for the FBE operation in the cell;
receiving, from the BS, an indication for enabling the UE to act as the initiating device for the FBE operation for a first one of the second plurality of FFPs in the cell;
performing a clear channel assessment (CCA) on a channel of the unlicensed band immediately before a start of the first one of the second plurality of FFPs in response to receiving the indication; and
performing an uplink (UL) transmission on the channel to initiate the first one of the second plurality of FFPs after determining that the channel is clear, wherein:
the UL transmission ends before an idle period of the first one of the second plurality of FFPs determined based on the second parameter,
in a case that the UL transmission is scheduled by an UL grant, the indication is indicated by a ChannelAccess-CPext-CAPC field in a Downlink Control Information (DCI) format carrying the UL grant, and the DCI format is received in one of the first plurality of FFPs.

12. The method of claim 11, wherein the first parameter and the second parameter are received via dedicated RRC signaling.

13. The method of claim 11, further comprising:
transmitting, to the BS, UE capability information indicating one or more FFP periodicity values,
wherein the second periodicity is configured based on the UE capability information.

14. The method of claim 11, further comprising:
receiving, from the BS, a third parameter indicating a third periodicity of a third plurality of FFPs used when the UE acts as the initiating device for the FBE operation in the cell, wherein:
the second parameter is specific to a first bandwidth part (BWP); and
the third parameter is specific to a second BWP.

15. The method of claim 11, wherein:
in a case that the UL transmission is scheduled by a configured grant (CG) configuration and a DCI format 2_0 is received, the indication is indicated by the CG configuration, a time division duplex (TDD) configuration, and the DCI format 2_0,
the CG configuration indicates the UL transmission within a number of symbols in front of the first one of the second plurality of FFPs,
the TDD configuration indicates the number of symbols as UL symbols or flexible symbols, and
the DCI format 2_0 indicates the number of symbols as UL symbols.

16. The method of claim 15, wherein
the DCI format 2_0 includes a slot format indication that indicates a slot format for multiple FFPs of the second plurality of FFPs including the first one of the second plurality of FFPs.

17. The method of claim 11, wherein the indication is received via a second RRC configuration that includes a bitmap, each bit of the bitmap indicating whether a corresponding FFP is initiated by the UE or the BS.

18. The method of claim 11, wherein the indication is received via a second RRC configuration that indicates at least one of a bandwidth part (BWP) and the cell on which the UE acts as the initiating device for the FBE operation.

19. The method of claim 11, wherein:
in a case that the UL transmission is scheduled by a random access response (RAR), the indication is indicated by the RAR.

20. The method of claim 11, wherein:
in a case that the UL transmission is scheduled by a configured grant (CG) configuration and a DCI format 2_0 is not received, the indication is indicated by the CG configuration and a time division duplex (TDD) configuration,
the CG configuration indicates the UL transmission within a number of symbols in front of the first one of the second plurality of FFPs, and
the TDD configuration indicates the number of symbols as UL symbols or flexible symbols.

* * * * *